No. 658,722. Patented Sept. 25, 1900.
A. MASION.
MANUFACTURE OF CHAINS.
(Application filed Apr. 9, 1900.)
(No Model.)
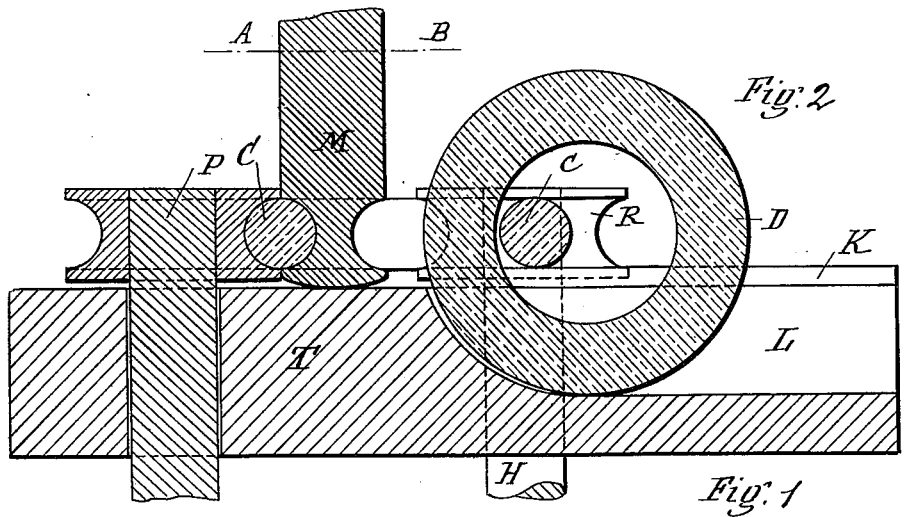
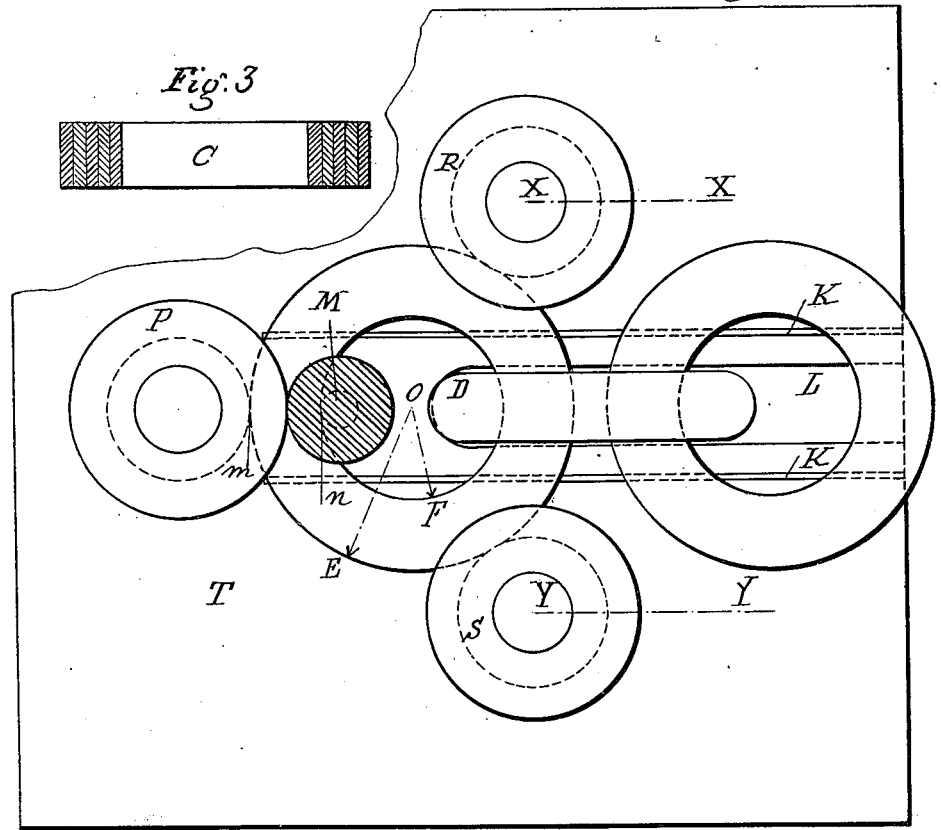
WITNESSES
INVENTOR
Alfred Masion
BY
Howson and Howson
ATTORNEYS

UNITED STATES PATENT OFFICE.

ALFRED MASION, OF BRUSSELS, BELGIUM.

MANUFACTURE OF CHAINS.

SPECIFICATION forming part of Letters Patent No. 658,722, dated September 25, 1900.

Application filed April 9, 1900. Serial No. 12,163. (No model.)

*To all whom it may concern:*

Be it known that I, ALFRED MASION, engineer, a subject of the King of Belgium, and a resident of 88 Rue Dautzenberg, Brussels, in the Kingdom of Belgium, have invented certain new and useful Improvements in the Manufacture of Chains, which invention is fully set forth in the following specification.

In the manufacture of chains by winding hoop or wire through a chain-link previously formed and where the hoop is wound hot and under pressure, so as to effect the welding and obtain a homogeneous section direct, the operation has to be performed very rapidly, and the handling of a thin band of metal heated to a welding heat is always difficult. As the chain-links produced by this method retain precisely the same sectional area which has been given them in the winding or coiling apparatus, no lengthening out of the fiber or rolling proper takes place. This rolling, which is necessary to impart strength to the metal and resistance to the chains, is also absent where the links are formed by winding wire or a metal band cold or at a low temperature and where the welding is afterward effected by compressing the links in matrices or dies or by other similar methods. Compression in dies, instead of giving strength to the metal, has the contrary effect of crushing it, disturbing its fiber texture, and diminishing its resistance.

This invention has for its objects to remedy the defects of either of the before-mentioned methods of manufacture, to enable the rolling effect proper to be secured in operating upon the links produced no matter by what apparatus the winding is effected, and to insure the welding of the superposed convolutions or coils by compression while admitting of the extension of the metal. To this end I provide improved apparatus wherein the wound or coiled links are subjected to a drawing action, whereby the strength of the links is increased. Where the strip to form the link is wound at a welding heat, the convolutions of the strip become welded as the winding proceeds and each link, when the winding is completed, is drawn out by compression, whereby the requisite strength is imparted to the metal. When the links are formed by simple convolutions superposed at a low temperature, the improved apparatus will effect the rolling, the welding, and the extension of the links.

Figures 1 and 2 of the accompanying drawings illustrate so much of my improved apparatus as is necessary to explain my invention, Fig. 1 being a plan partly in section on line A B, Fig. 2, and Fig. 2 a longitudinal vertical section of Fig. 1. Fig. 3 is a sectional view of a coiled hoop from which I weld and roll a chain-link according to my process.

The apparatus mainly comprises, first, a cylinder or roll M, around which is placed the ring C of metal to be rolled, the diameter of the roll M being sufficiently small relatively to the diameter of the ring C to permit of the formation of a chain-link within the said ring C or link previously made; second, a cylinder or roll P, arranged opposite the roll M, so that the metal of the chain-link is rolled between the two rolls P and M, and, third, two or more cylinders or rolls R and S, arranged so as to insure the proper diameter being given to the link being rolled.

It will be understood that owing to the compression between the rolls P and M of the link or ring C the metal thereof is drawn out to the necessary extent to give strength to the metal, the link being enlarged by such rolling action until it touches the bottoms of the peripheral grooves in the cylinders or rolls R and S.

Where the apparatus is used as a substitute for dies for welding links, the link C to be welded, Fig. 3, is first tightly compressed between the three cylinders P, R, and S, while at the same time it will be pressed by the inner cylinder M against the outer cylinder or roll P, the apparatus thus constituting, in fact, a revolving matrix, and no extension of the metal being possible the welding is effected under the compressing strain exercised on all sides. If it were not for the presence of the cylinders R and S, the superposed convolutions forming the ring would be drawn out and would continually undergo changes of their relative position to each other, and consequently would not weld. As soon as the welding has been completed the cylinders R and S are caused to recede somewhat, so as to admit of the enlargement necessary to give the metal the requisite degree of strength. In order to carry out these operations, it is essential that the cylinders R and S should be capable of moving toward and from cylinder M—for instance, in the direction of the dotted lines $x\,x$ and $y\,y$, respectively—their shafts H being pivoted for the purpose. They are first moved outward to admit of the insertion of the chain-link to be rolled. Then they are moved inward, so that the welding may be effected, and in the next place they are slightly moved outward to permit of the link being extended or enlarged.

It is necessary that the roll M should be capable of rising sufficiently to admit of the placing in position of the chain-link, then of redescending, and, lastly, of being pressed against the roll P.

In determining the speed of rotation of the inner roll M, so as to avoid tearing the metal of the link, it should be borne in mind that each point of the link while it is being rolled describes a circle about its center O and the speeds of the points $m$ and $n$ of the link C stand in the same relation to each other as the radii O E and O F.

The peripheral grooves of the cylinders or rolls shown in the drawings are circular, such rolls being adapted while rolling the metal to impart a circular section to links which are originally of square section and formed by winding a band of rectangular section.

Instead of being arranged horizontally and forming a work bench or table, as indicated in the drawings, it may, if preferred, be arranged vertically. K K are ribs provided on the table or bench T for the purpose of reducing to a minimum the friction between the link C and the bench. L is a recess formed in the bench T for the reception of the link last made.

Having now particularly described and ascertained the nature of this invention and in what manner the same is to be performed, I declare that what I claim is—

The process of welding and rolling chain-links, formed by winding or coiling hoop or wire, consisting in applying a rolling pressure to the interior and exterior of the coiled hoop or wire, while confining the periphery of the coiled ring to prevent enlargement of the ring and to prevent displacement of its convolutions during the welding, and then continuing the rolling without confinement of the ring to enable the ring of welded coils to be rolled out to the desired size and section, substantially as described.

In testimony whereof I have signed my name to this specification in the presence of two subscribing witnesses.

ALFRED MASION.

Witnesses:
GUSTAVE PIERRY,
EMILE NUYTS.